United States Patent
Kluttz et al.

(10) Patent No.: US 7,728,074 B2
(45) Date of Patent: Jun. 1, 2010

(54) PROCESS FOR PREPARING A BITUMINOUS BINDER COMPOSITION

(75) Inventors: Robert Q. Kluttz, Houston, TX (US); Keith E. Stephens, Waxahachie, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 0 days.

(21) Appl. No.: 12/536,191

(22) Filed: Aug. 5, 2009

(65) Prior Publication Data

US 2009/0299010 A1 Dec. 3, 2009

Related U.S. Application Data

(62) Division of application No. 11/598,511, filed on Nov. 13, 2006, now Pat. No. 7,592,381.

(60) Provisional application No. 60/736,466, filed on Nov. 14, 2005.

(51) Int. Cl.
*C08L 53/02* (2006.01)
(52) U.S. Cl. ........................................... 525/99
(58) Field of Classification Search .................... 524/99
See application file for complete search history.

(56) References Cited

U.S. PATENT DOCUMENTS

| | | |
|---|---|---|
| 3,231,635 A | 1/1966 | Holden et al. |
| 3,244,664 A | 4/1966 | Zelinski et al. |
| 3,251,905 A | 5/1966 | Zelinski |
| 3,281,383 A | 10/1966 | Zelinski et al. |
| 3,390,207 A | 6/1968 | Moss et al. |
| 3,594,452 A | 7/1971 | De La Mare et al. |
| 3,598,887 A | 8/1971 | Darcy et al. |
| 3,692,874 A | 9/1972 | Farrar et al. |
| 3,880,954 A | 4/1975 | Kahle et al. |
| 3,985,830 A | 10/1976 | Fetters et al. |
| 4,076,915 A | 2/1978 | Trepka |
| 4,104,332 A | 8/1978 | Zelinski |
| 4,129,541 A | 12/1978 | Marrs et al. |
| 4,145,322 A | 3/1979 | Maldonado et al. |
| 4,185,042 A | 1/1980 | Verkouw |
| 4,219,627 A | 8/1980 | Halasa et al. |
| 4,242,246 A | 12/1980 | Maldonado et al. |
| 4,379,891 A | 4/1983 | Haynes |
| 4,412,019 A | 10/1983 | Kraus |
| 4,530,652 A | 7/1985 | Buck et al. |
| 5,075,377 A | 12/1991 | Kawabuchi et al. |
| 5,182,319 A | 1/1993 | Mitchell |
| 5,190,998 A | 3/1993 | Fisher |
| 5,272,214 A | 12/1993 | Custro et al. |
| 5,371,121 A | 12/1994 | Bellomy et al. |
| 5,681,895 A | 10/1997 | Bening et al. |
| 5,795,929 A | 8/1998 | Grubba |
| 5,798,401 A | 8/1998 | Korenstra et al. |
| 5,854,335 A | 12/1998 | Heimerikx et al. |
| 6,031,029 A | 2/2000 | Baumgardner et al. |
| 6,087,420 A | 7/2000 | Planche et al. |
| 6,120,913 A | 9/2000 | Kluttz et al. |
| 6,136,921 A | 10/2000 | Hsieh et al. |
| 6,150,439 A | 11/2000 | Keiichi et al. |
| 6,451,886 B1 | 9/2002 | Krivohlavek et al. |
| 6,486,236 B2 | 11/2002 | Wollum et al. |
| 6,492,439 B2 | 12/2002 | Wollum et al. |
| 6,508,875 B1 | 1/2003 | Bodt et al. |
| 6,538,053 B1 | 3/2003 | Drieskens et al. |
| 6,759,454 B2 | 7/2004 | Stephens et al. |
| 6,833,411 B2 | 12/2004 | Fujiwara et al. |
| 2004/0077789 A1 | 4/2004 | Toda et al. |
| 2005/0004273 A1 | 1/2005 | Chun et al. |
| 2005/0065287 A1 | 3/2005 | Willis et al. |
| 2005/0137295 A1 | 6/2005 | Kendrick et al. |
| 2005/0228119 A1 | 10/2005 | Vermunicht et al. |
| 2006/0030671 A1 | 2/2006 | Boerner et al. |
| 2006/0074152 A1 | 4/2006 | Graves et al. |
| 2006/0183844 A1 | 8/2006 | Vermunicht et al. |

FOREIGN PATENT DOCUMENTS

| | | |
|---|---|---|
| CN | 1141926 A1 | 2/1997 |
| DE | 19857768 A1 | 6/2000 |
| DE | 20310484 U1 | 11/2003 |
| DE | 10330820 A1 | 2/2005 |
| EP | 0387671 A1 | 3/1990 |
| EP | 0413294 A2 | 2/1991 |
| EP | 0636654 B1 | 2/1995 |
| EP | 0838510 A1 | 4/1998 |
| EP | 0940440 A1 | 9/1999 |

(Continued)

*Primary Examiner*—Peter Szekely
(74) *Attorney, Agent, or Firm*—Kraton Polymers U.S. LLC; Novak Druce & Quigg LLP

(57) ABSTRACT

A block copolymer composition including a diblock copolymer (I) having one block of a monovinylaromatic hydrocarbon and one block of a conjugated diene having a peak molecular weight from 30,000 to 78,000 and one or more block copolymers (ii) comprising at least two blocks of monovinylaromatic hydrocarbon and at least one block of conjugated diene, the block copolymer selected from linear triblock copolymers having a peak molecular weight that is 1.5 to 9.0 times the peak molecular weight of the diblock copolymer, and mixtures thereof, wherein the ratio of (i) to (ii) is greater than 1:1.

3 Claims, No Drawings

FOREIGN PATENT DOCUMENTS

| | | | |
|---|---|---|---|
| EP | 1602673 | A1 | 2/2004 |
| EP | 1464672 | A1 | 10/2004 |
| JP | 63-234063 | A | 9/1988 |
| JP | 03413961 | A1 | 6/1991 |
| JP | 03-281515 | A2 | 12/1991 |
| JP | 03-281651 | A2 | 12/1991 |
| JP | 03-287617 | A2 | 12/1991 |
| JP | 05279574 | A1 | 10/1993 |
| JP | 06-041439 | A2 | 2/1994 |
| JP | 08-259646 | A2 | 10/1996 |
| JP | 09-012898 | A2 | 1/1997 |
| JP | 10-212416 | A2 | 8/1998 |
| JP | 10-279809 | A2 | 10/1998 |
| JP | 02-030126 | A2 | 1/2002 |
| JP | 10279809 | A2 | 7/2008 |
| WO | 9422931 | A1 | 10/1994 |
| WO | 2007051703 | A1 | 5/2007 |

PROCESS FOR PREPARING A BITUMINOUS BINDER COMPOSITION

This application is a division of U.S. patent application Ser. No. 11/598,511, filed Nov. 13, 2006 and which is a non-provisional application of U.S. Patent Application No. 60/736,466.

FIELD OF THE INVENTION

The present invention relates to a process for preparing a polymer modified bituminous binder composition in the substantial absence of crosslinking agents, said polymer modified bituminous binder composition being suitable for hot mix asphalt paving applications and broadly comprising mixing a bitumen component and a block copolymer composition containing a high vinyl content diblock copolymer and an optional high vinyl content block copolymer selected from linear triblock copolymers, multiarm coupled block copolymers and mixtures thereof at a temperature from about 185° C. to about 221° C., wherein said diblock copolymer is present alone or is present at a ratio of greater than 1:1 when combined with the other noted copolymers. The present invention further relates to a specific class of bituminous binder compositions comprising a bitumen component and a block copolymer composition of a high vinyl content diblock copolymer and a high vinyl content block copolymer that is either a linear triblock copolymer, a multiarm coupled block copolymer or a mixture thereof, as well as a bituminous binder concentrate containing the same. The present invention even further relates to a specific class of polymer compositions comprising a high vinyl content diblock copolymer and a high vinyl content block copolymer that is either a linear triblock block copolymer, a multiarm coupled block copolymer or a mixture thereof.

BACKGROUND OF THE INVENTION

Polymer modified asphalt for paving applications and methods for preparing various polymer modified asphalt compositions are well known in the art. Various polymers, including diene elastomers such as polybutadiene, EPDM, EPR and styrenic block copolymers (SBCs) such as styrene-butadiene-styrene (SBS) and styrene-isoprene-styrene (SIS) block copolymers, are commonly combined with bitumen to improve the performance of the bitumen. See, for example, U.S. Pat. No. 5,190,998 and U.S. Pat. No. 6,150,439. It is well known in the art to utilize styrenic block copolymers to improve the performance of bitumen. The degree to which property improvements are realized depends upon the compatibility of the block copolymer and the bitumen. Highly compatible or compatibilized polymers are most effective in providing property improvements. Over the years, researchers have developed a range of chemical techniques to improve the compatibility of these types of polymers with bitumens. An extensive range of additives have been used for the purpose of "curing" or "crosslinking" the polymers and bitumens thereby rendering the mixture compatible. These additions include sulfur crosslinking agents and sulfur-containing crosslinking agents. Sulfur has long been known to be added to polymer modified bitumens to strengthen and accelerate the polymer-bitumen bonding and curing process. See, for example, U.S. Pat. No. 4,145,322 and U.S. Pat. No. 4,242,246. While sulfur itself is relatively safe, the reaction between sulfur, the block copolymers and asphalt generates hydrogen sulfide ($H_2S$) which is extremely hazardous. Accordingly, from an environmental and safety standpoint, there is a strong desire to eliminate sulfur and sulfur containing crosslinking agents which aid in the curing of bituminous formulations.

In addition, there are improvements associated with the use of styrenic block copolymers which the bitumen paving industry would like to see. These improvements include, but are not limited to, improved mixing, shorter cure times, less separation with incompatible asphalts, and increased efficiency.

Bituminous compositions containing block copolymer compositions having a high vinyl content or block copolymer compositions having a high vinyl content and a low diblock content have been used in an attempt to provide bituminous compositions with better properties. See, for example, U.S. Pat. No. 4,530,652, U.S. Pat. No. 5,798,401, U.S. Pat. No. 5,854,335, and U.S. Pat. No. 6,508,875. Compositions high in diblock have also been used to prepare bituminous compositions in an effort to provide rapid and easy mixing and to improve dispersion. See, for example, U.S. Patent Publication No. 2005/0137295 and U.S. Patent Publication No. 2005/0004273.

While many formulations have attempted to overcome one or more of these issues, many fail or only address a small number of the issues. There still exists a need for an improved process for preparing polymer-modified bituminous binder compositions using existing asphalt facilities while maximizing properties and minimizing many of the environmental and safety concerns associated with such processes. Ideally, such a process would provide ready mixing, produce a product that is stable in storage, and result in a quick cure of polymer and bitumen.

SUMMARY OF THE INVENTION

Accordingly, the present invention provides a way to produce polymer modified bituminous binder compositions for road/paving applications without the necessity of adding crosslinking agents thereby greatly decreasing many of the environmental and safety concerns associated with the use of such crosslinking agents while at the same time maintaining or improving the properties of the compositions. More specifically, the present invention provides a process for preparing a polymer modified bituminous binder composition in the substantial absence of crosslinking agents by:

a. heating a bitumen component in a stirred tank to a temperature from about 185° C. to about 221° C.;

b. adding a block copolymer composition to the bitumen component while stirring the bitumen component to form a homogeneous mixture of the bitumen component and the block copolymer composition; and c. continuing to stir the homogeneous mixture while maintaining the temperature from about 185° C. to about 221° C. for a period of time from about 4 hours to about 30 hours until a cured polymer modified bituminous binder composition is obtained;

wherein said block copolymer composition comprises (i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and (ii) optionally one or more block copolymers comprising at least two blocks of monovinylaromatic hydrocarbon and at least one block of conjugated diene, the block copolymer selected from linear triblock copolymers, multiarm coupled block copolymers, and mixtures thereof, the linear triblock copolymers having a peak molecular weight that is 1.5 to 3.0 times the peak molecular weight of the diblock copolymer and multiarm coupled block copolymers having a peak molecular weight that is 1.5 to 9.0 times the peak molecular weight of the diblock copolymer, and each having a vinyl content from about 35 to about 80 mmol percent based on the number of repeat monomer units in the conjugated diene block, wherein when both (i) and (ii) are present, the ratio of (i) to (ii) is greater than 1:1. Optionally, this process further comprises the step of diluting the homogeneous mixture to a lesser concentration either during or after the curing of the polymer modified bituminous binder composition.

The present invention further provides an alternative process which comprises the steps of:

a. heating a bitumen component in a stirred tank until it reaches a molten state;

b. adding a block copolymer composition to the bitumen component;

c. raising the temperature of the bitumen component and block copolymer composition to from about 185° C. to about 221° C. while stirring the bitumen component and block copolymer composition thereby forming a homogeneous mixture of the bitumen component and the block copolymer composition;

d. continuing to stir the homogeneous mixture while maintaining the temperature from about 185° C. to about 221° C. for a total period of time from about 4 hours to about 30 hours until a cured polymer modified bituminous binder composition is obtained;

wherein said block copolymer composition is (i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and (ii) optionally one or more block copolymers comprising at least two blocks of monovinylaromatic hydrocarbon and at least one block of conjugated diene, the block copolymer selected from linear triblock copolymers, multiarm coupled block copolymers, and mixtures thereof, the linear triblock copolymers having a peak molecular weight that is 1.5 to 3.0 times the peak molecular weight of the diblock copolymer and multiarm coupled block copolymers having a peak molecular weight that is 1.5 to 9.0 times the peak molecular weight of the diblock copolymer, and each having a vinyl content from about 35 to about 80 mol percent based on the number of repeat monomer units in the conjugated diene block, wherein when both (i) and (ii) are present, the ratio of (i) to (ii) is greater than 1:1. Optionally, this process further comprises the step of diluting the homogeneous mixture to a lesser concentration either during or after the curing of the polymer modified bituminous binder composition.

The present invention even further relates to a specific class of bituminous binder compositions and bituminous binder concentrates which comprise a bitumen component and a block copolymer composition comprising a high vinyl diblock copolymer and either a high vinyl linear triblock copolymer, a high vinyl multiarm block copolymer, or mixtures thereof, at a ratio of diblock copolymer to linear triblock copolymer, multiarm block copolymer or mixtures thereof, of greater than about 1:1, which copolymers comprise at least one block of a conjugated diene and at least one block of a monovinylaromatic hydrocarbon. The present invention still further relates to the specific block copolymer compositions utilized in the above noted bituminous binder compositions and bituminous binder concentrates.

DETAILED DESCRIPTION

The process of the present invention is particularly useful for preparing polymer modified bituminous binder compositions to be used for road/paving applications of all sorts. By using the process of the present invention, which does not require the use of crosslinking agents, it is possible to prepare polymer modified bituminous binder compositions that not only demonstrate properties that are as good, if not better, than the prior art polymer modified bituminous binder compositions which use crosslinking agents, but which are also safer and more environmentally friendly due to the elimination of the crosslinking agents. In addition, the polymer modified bituminous binder compositions of the present invention exhibit improved processability, a decreased cure time, and a reduction in phase separation.

In one embodiment of the present process, a bitumen component is heated in a stirred tank to a temperature from about 185° C. to about 221° C. The bitumen component utilized in the process according to the present invention may be any naturally occurring bitumen or it may be derived from petroleum. In addition, petroleum pitches obtained by a cracking process and coal tar can be used as the bitumen component as well as blends of various bitumen materials. Examples of suitable components include, but are not limited to, distillation or "straight-run bitumens", precipitation bitumens (e.g. propane bitumens), blown bitumens (e.g. catalytically blown bitumen), multigrades, and mixtures thereof. Other suitable bitumen components include, but are not limited to, mixtures of one or more of these bitumens with extenders (fluxes) such as petroleum extracts, e.g. aromatic extracts, distillates or residues, or with oils. Suitable bitumen components (either "straight-run bitumens" or "fluxed bitumens") are those having a penetration of in the range of from about 25 to about 400 units at 25° C.; therefore quite hard bitumens of a penetration of from about 60 to about 70 units may be used, but generally a straight run or distilled bitumen having a penetration from about 110 to about 250 units will be the most convenient to use. Both compatible as well as incompatible bitumens may be used.

The success of the process of the present invention is not dependent upon the type of tank (or vessel) utilized to prepare the polymer modified bituminous binder composition of the present invention. Accordingly, any known tank or vessel utilized in the preparation of bitumen compositions can be used provided that such tank or vessel has stirring (agitation) and heating capabilities. As used within the scope of the present invention, the phrase "stirred tank" refers to such tanks and vessels that have stirring (agitation) and heating means. Suitable stirring or agitation includes, but is not limited to, vertical impellers, side-arm impellers and pump around circulation. In terms of carrying out the process, the bitumen component is typically placed in the stirred tank and gradually heated to a temperature from about 185° C. to about 221° C., alternatively from about 196° C. to about 218° C., and in still another alternative, from about 198° C. to about 216° C. The bitumen component is typically stirred or agitated during this heating phase. While the presence of air is not detrimental to the process of the present invention (i.e., the use of an open air vessel which results in the surface of the mixture coming in contact with air), the intentional introduction of air (as in the case of air curing or blown bitumen) is not necessary to the process of the present invention and is in fact discouraged since such addition would most likely result in the hardening of the bitumen component.

In the present embodiment, once the bitumen component has reached the desired temperature, the block copolymer composition (described hereinbelow) is added while the bitumen component is being stirred in order to form a homogeneous mixture of the bitumen component and the block copolymer composition.

The manner and form in which the block copolymer composition is added to the bitumen component is also not critical to the invention. Therefore, block copolymer compositions in the form of powders, porous pellets, and/or crumb may be added all at once or divided into small amounts or batches and added at intervals over a brief period of time (e.g. over a period of 5 to 60 minutes although slightly shorter or longer times are also envisioned). In most instances, the block copolymer composition is added in the form of a porous pellet all at once. Addition of the block copolymer composition over an even longer period of time is also possible but not necessarily desirable from an economic standpoint. During the addition of the block copolymer composition, the mixture is stirred and the temperature to which the bitumen component was heated (from about 185° C. to about 221° C.) is maintained.

In many bitumens, the block copolymer composition may dissolve and form a homogeneous blend with simple stirring or other agitation means as noted above. In hot mix asphalts, the bitumen forms a thin film on the aggregate that is present. It is generally accepted that the thickness of this film is on the order of approximately ten microns. Bitumen additives are generally considered to be homogeneous within a blend if they completely disperse in the bitumen on an equal or finer scale than the film of bitumen on aggregate. On the other hand, it is well known that SBS polymers dispersed in bitumen to form a phase structure comprising a polymer rich phase and a bitumen rich phase. It is generally accepted that the scale of this phase structure is on the order of less than approximately ten microns. Accordingly, as used herein with regard to the present invention, the phrase "homogeneous blend" refers to a mixture that comprises the bitumen component and block copolymer composition such that the block copolymer composition is dispersed within the bitumen component on the approximate ten micron scale or less.

In certain instances it may be desirable to accelerate this blending process by passing the mixture through a high shear mill. While a high shear mill may be utilized for the entire process, it is typically utilized for a sufficient period of time for the block copolymer to form a homogeneous blend with the bitumen component. Thereafter the stirring is typically accomplished utilizing low shear blending. Both of these processes are well known in the art and are contemplated to be within the scope of the present invention. Once the block copolymer composition and bitumen are mixed, the stirring continues for a period of time from about 4 to about 30 hours while the temperature of the mixture is maintained in order to allow for complete curing of the mixture prior to use. In alternative embodiments of the present process, the stirring occurs for periods of time from 4 to 26 hours, even more preferably from 6 to 24 hours. Note that when the block copolymer composition is added over a longer period of time as noted above, the final time for stirring may need to be adjusted accordingly to take into consideration the duration of block copolymer addition.

The quantity of block copolymer composition to be added in the process of the present invention can vary based on whether it is desirable to have a concentrate which will be subsequently diluted ("let down") before further use or whether the amount added provides the final dilution to be used at that time (the final product). Accordingly, the amount to be added will be such that the amount of block copolymer composition added to the bitumen component will be from as little as about 2% by weight to as high as about 36% by weight, based on the weight of the polymer modified bituminous binder composition. As used within the scope of this application, the term "let down", as known to those skilled in the art of bitumen, is an industry term used to reference the dilution or diluting of a concentrate bituminous binder composition to the final concentration that will be used. For example, the process of the present invention can be utilized to produce a bituminous binder concentrate which will contain from about 6% by weight to about 36% by weight, preferably from about 9 to 30%, and more preferably from about 12% by weight to about 22% by weight, block copolymer composition (based on the total weight of the polymer modified bitumen binder composition). This bituminous binder concentrate will at some point be diluted with more bitumen to achieve the desired final concentration for final use (typically from about 2% by weight to about 6% by weight based on the total weight of the polymer modified bitumen binder composition). The process of diluting a polymer modified bituminous binder concentrate to the desired concentration for use is well known in the art as a cost effective method of utilizing blending equipment. The bituminous binder concentrate of the present invention may be diluted ("let down") to the final concentration during or immediately following the curing process or, in the alternative, it may be stored and/or shipped to a different location where it will later be diluted ("let down") to the final concentration. Accordingly, the process of the present invention may optionally contain further steps in the production of polymer modified bituminous binder compositions. One such embodiment allows for the preparation of a concentrate comprising 6 to 36% by weight of the block copolymer composition followed by the dilution of the concentrate with more bitumen to achieve the desired final concentration (preferably for a final concentration of from about 2% by weight to about 6% by weight). This dilution may occur either during curing (step (c)) or subsequent to curing after step (c) provided that the temperature is maintained for the required time to achieve the cure. During or subsequent to curing, the composition may be shipped to a different location provided that adequate temperature and agitation are maintained. When diluting during the cure, the composition may be diluted as soon as the concentrate blend becomes homogeneous (at the beginning of step (c) or as the composition cures (during step (c)). This embodiment is advantageous when expensive milling equipment is used so that higher throughput may be achieved. Alternatively, the concentrate composition may be let down after the curing process is complete. This embodiment is advantageous for long term storage as the diluting bitumen may be introduced at a much lower temperature resulting in a final blend at a temperature more suitable for long term storage.

In embodiments where the asphalt composition is to be used at that time or where more dilute concentrations are desired, the block copolymer composition will preferably be present in an amount from about 2% by weight to about 6% by weight, and most preferably from about 2.5% by weight to about 5% by weight, based on the total weight of the polymer modified bituminous binder composition.

The present invention further provides for an alternative to the above process that differs from the above process in that the bitumen is first heated to a molten state, the block copolymer composition is added, and then the temperature is raised to the level for curing, from about 185° C. to about 221° C. Accordingly, the present alternative only includes changes in the process steps themselves, not within the types of materials utilized (e.g., bitumen and block copolymer composition) or means of accomplishing the steps (e.g., type of equipment utilized). More specifically, in this alternative, the bitumen component, as described hereinbefore, is heated in a stirred tank until the bitumen component is in a molten state. As used herein, the phrase "molten state" refers to the point at which the bitumen component becomes liquid. Those skilled in the art will recognize that most bitumens reach a "molten state" within the temperature range of from about 87° C. to about 121° C., more specifically from about 93° C. to about 105° C. During this phase, the bitumen component is optionally stirred. Once the bitumen component reaches a molten state, the block copolymer composition is added in the manner described hereinbefore. At this point, if the mixture is not already being stirred, active stirring may begin although stirring is not necessary. After the block copolymer composition is added, the temperature is raised to from about 185° C. to about 221° C., alternatively from about 196° C. to about 218° C., and in still another alternative, from about 198° C. to about 216° C. (as described hereinbefore) while actively stirring the bitumen component and block copolymer composition in order to form a homogeneous mixture of the two components. This mixture will continue to be stirred at the noted temperature for a total of from about 4 hours to about 30 hours until a cured polymer modified bituminous binder composition is obtained. In the alternative, the homogeneous mixture will be further let down as described hereinbefore either during or after the curing of the polymer modified bituminous binder composition.

Through the use of compositions having high vinyl content copolymers and a high quantity of diblock copolymer, it is possible to eliminate the use of crosslinking agents in the preparation of polymer modified bitumen. Accordingly, with the present invention it is possible to produce a polymer modified bituminous binder composition or a bituminous binder concentrate in the substantial absence of crosslinking agents. As used herein, the phrase "in the substantial absence of crosslinking agents" means that the addition of crosslinking or curing agents during the preparation process is not required. Furthermore, with regard to the bituminous binder composition and the bituminous binder concentrate the phrase "substantially free of crosslinking agents" means that no substantial amount of crosslinking agent is present in the product. However, traces of such crosslinking or curing agents may be present due to the active addition of insubstantial amounts of crosslinking or curing agent or residual amounts from another source such as with the addition of ground rubber and/or what naturally occurs in the bitumen. Such an amount would be considered to be in an insubstantial amount provided that it does not significantly alter the final properties of the bituminous binder composition, typically less than about 0.01% of the total weight of the polymer modified bituminous binder composition or bituminous binder concentrate. Without wishing to be bound by the following statements, it is believed that when block copolymers having a specific diblock content and a specific vinyl content are utilized in a process for preparing polymer modified asphalts at a temperature from about 185° C. to about 221° C., it is possible to achieve self-controlling thermal crosslinking (cure) that normally requires the use of crosslinking agents to achieve this cure. The resulting blend is storage stable (it does not separate), and the cure is faster than observed with conventional systems. The bituminous binder composition exhibits as good or better properties as conventional bituminous binder compositions, including a reduction in phase separation.

The block copolymer composition to be used in the above noted processes of the present invention comprises:

(i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and (ii) optionally one or more block copolymers comprising at least two blocks of monovinyl aromatic hydrocarbon and at least one block of conjugated diene, said block copolymers selected from linear triblock copolymers having a peak molecular weight that is about 1.5 to about 3.0 times the peak molecular weight of the diblock copolymer (i) and a vinyl content from about 35 to about 80 mol percent based on the number of repeat monomer units in the conjugated diene block, multiarm coupled block copolymers having a peak molecular weight that is about 1.5 to about 9.0 times the peak molecular weight of the diblock copolymer (i) and a vinyl content from about 35 to about 80 mol percent based on the number of repeat monomer units in the conjugated diene block, and mixtures thereof.

Preferably, the block copolymer composition utilized in the processes comprises a diblock copolymer and either a linear triblock copolymer or a multiarm coupled block copolymer. While hydrogenation of block copolymers is well known in the art, the block copolymers of the present invention are in substantially unhydrogenated form.

In one preferred embodiment of the present invention, the diblock copolymer is of the formula A-B, the linear triblock copolymer is of the formula A-B-A and the multiarm coupled block copolymer is of the formula $(A-B)_n X$, where in said formulas A is a monovinyl aromatic hydrocarbon block, B is a conjugated diene block, n is an integer from 2 to 6 and X is the residue of a coupling agent. When the multiarm coupled block copolymers of the formula $(A-B)_n X$ are utilized, n will preferably be an integer from 2 to 4, with 2 being the most preferred.

While the monovinyl aromatic hydrocarbon block may be any monovinyl aromatic hydrocarbon known for use in the preparation of block copolymers such as styrene, o-methylstyrene, p-methyl styrene, p-tert-butyl styrene, 2,4-dimethylstyrene, alpha-methylstyrene, vinylnaphthalene, vinyltoluene and vinylxylene or mixtures thereof, the most preferred monovinyl aromatic hydrocarbon for use in the process of the present invention is styrene, which is used as a substantially pure monomer or as a major component in mixtures with minor proportions of other structurally related vinyl aromatic monomer(s) such as o-methylstyrene, p-methylstyrene, p-tert-butylstyrene, 2,4-dimethylstyrene, α-methylstyrene, vinylnaphtalene, vinyltoluene and vinylxylene, i.e., in proportions of at most 10% by weight. The use of substantially pure styrene is most preferred in the present process.

Similarly, the conjugated diene block may be any conjugated diene known for use in the preparation of block copolymers provided that the conjugated diene has from four to eight carbon atoms. Preferably, the conjugated diene used for the preparation of the conjugated diene blocks is a butadiene monomer or an isoprene monomer that is substantially pure monomer or contains minor proportions, up to 10% by weight, of structurally related conjugated dienes, such as 2,3-dimethyl-1,3-butadiene, 1,3-pentadiene and 1,3-hexadiene. Preferably, substantially pure butadiene or substantially pure isoprene is utilized for the preparation of the conjugated diene blocks, with substantially pure butadiene being the most preferred. Note that the conjugated diene block may also comprise a mixture of butadiene and isoprene monomers.

As used herein with regard to the block copolymers of the present invention, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The peak molecular weight of each monovinyl aromatic hydrocarbon block is from about 10,000 to about 25,000, preferably from about 12,000 to about 20,000. In an alternative embodiment, the peak molecular weight is from about 14,000 to about 18,000.

Each diblock copolymer utilized in the process of the present invention will have a peak molecular weight from about 30,000 to about 78,000, preferably from about 48,000 to about 78,000. The peak molecular weight of the linear triblock copolymers and multiarm coupled block copolymers (ii) is dependent upon the peak molecular weight of the diblock copolymers (i) utilized. More specifically, the peak molecular weight of the triblock copolymers (ii) will range from about 1.5 to about 3.0 times the peak molecular weight of the diblock copolymer (i). Preferably, in those embodiments where the block copolymer (ii) is a linear triblock copolymer, the peak molecular weight of the linear triblock copolymers will range from about 1.8 to about 2.5 times the peak molecular weight of the diblock copolymer (i). The peak molecular weight of the multiarm coupled block copolymers (ii) will range from about 1.5 to about 9.0 times the peak molecular weight of the diblock copolymer (i). In those embodiments where the block copolymer (ii) is a multiarm coupled block copolymer, the peak molecular weight will preferably range from about 1.8 to about 5.0 times the peak molecular weight of the diblock copolymer (i).

It will be appreciated that the term "vinyl content" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 35 to about 80 mol percent of the condensed butadiene units in the polymer block have a 1,2-addition configuration. Preferably, from about 46 to about 70 mol percent of the condensed butadiene units should have 1,2-addition configuration, even more preferably from about 50 to about 65 mol percent of the butadiene units should have 1,2-addition configuration and still even more preferably from about 52 to about 65 mol percent of the butadiene units should have 1,2-addition configuration. When referring to the use of isoprene as the conjugated diene, it is also preferred that about 35 to 80 mol percent of the condensed isoprene units in the block have 3,4-addition configuration. Preferably, from about 46 to about 70 mol percent of the condensed isoprene units in the block have 3,4-addition configuration, even more preferably from about 50 to about 65 mol percent of the isoprene units should have 3,4-addition configuration, and still even more preferably from about 52 to about 65 mol percent of the butadiene units should have 1,2-addition configuration.

The monovinyl aromatic hydrocarbon content of the copolymers (in the present case with regard to each individual diblock copolymer, linear triblock copolymer or multiarm coupled block copolymer) is suitably from about 10 to about, 55% by weight, based on the total block copolymer. Preferably, the content of monovinyl aromatic hydrocarbon of the copolymers will be from about 15 to about 45% by weight, more preferably from about 22 to about 37% by weight, and most preferably from about 25 to about 35% by weight, based on the total weight of the copolymer.

In particular embodiments of the present invention, the block copolymer compositions of the present invention will have a melt index greater than 15 g/10 min. For purposes of the block copolymers utilized of these embodiments, the term "melt index" is a measure of the melt flow of the polymer according to ASTM D 1238, under condition G at 200° C. at 5 kg load. It is expressed in units of grams of polymer melt passing through an orifice in 10 minutes. Broadly, the block copolymer compositions of the present invention have a melt index greater than 15 grams/10 minutes. Preferably, the melt index will range from greater than 15 to about 50 grams/10 minutes, more preferably from about 16 to about 35 grams/10 minutes.

As noted above, the block copolymer composition utilized in the processes of the present invention may comprise 100% diblock or it may comprise a mixture of diblock copolymer and either a linear triblock copolymer, a multiarm coupled block copolymer, or mixtures thereof. Preferably, the combination of diblock copolymer and multiarm coupled block copolymer is used. When the block copolymer composition comprises a mixture of diblock copolymer and either a linear triblock copolymer, a multiarm coupled block copolymer, or a mixture thereof, the ratio of the diblock copolymer to linear triblock copolymer, multiarm coupled block copolymer or mixture thereof will be greater than about 1:1, preferably equal to or greater than about 3:2. In a particularly preferred embodiment, the ratio of the diblock copolymer to linear triblock copolymer, multiarm coupled block copolymer, or mixture thereof will be from about 3:2 to about 10:1 with the most preferred ratio being from about 4:1 to about 7:3. In other words, in the broadest sense of the present invention, when the block copolymer composition comprises a diblock copolymer and either a linear triblock copolymer, a multiarm coupled block copolymer, or a mixture thereof, the linear triblock copolymer, multiarm coupled block copolymer, or mixture thereof will always be present in an amount less than that of the diblock copolymer (e.g., the linear triblock copolymer, multiarm coupled block copolymer, or mixture thereof will be present in the block copolymer composition in an amount of at most 49.9% by weight, preferably at most 40% by weight).

In a still further embodiment of the present process, the objective of the process is to produce a polymer modified bituminous binder composition in which the ratio of the diblock copolymer to linear triblock copolymer, multiarm coupled block copolymer, or mixture thereof is equal to or greater than 3:2, the vinyl content of each copolymer is from about 35 mol percent to about 80 mol percent based on the number of repeat monomer units in the conjugated diene block of the copolymer, and the peak molecular weights of the diblock and linear triblock copolymer, multiarm coupled block copolymer, or mixtures thereof are such that the weighted average molecular weights of the diblock copolymer and other block copolymer are less than 100,000. Take for example a composition containing a diblock copolymer (A-B) and a multiarm coupled block copolymer ((A-B)$_2$X) having a ratio of diblock copolymer to multiarm coupled block copolymer of 3:2. When the peak molecular weight of the diblock is 55,000, the peak molecular weight of the multiarm coupled block copolymer will be 110,000. Accordingly, the block copolymer composition will comprise 60% diblock copolymer and 40% multiarm coupled block copolymer. Therefore, 55,000×0.60 is equal to 33,000 while 110,000× 0.40 is equal to 44,000. The sum of 33,000 and 44,000 gives the weighted average molecular weight of the block copolymer composition. In this particular example, the weighted average molecular weight is 77,000, less than 100,000.

The present invention still even further relates to a specific class of block copolymer compositions that comprise:

(1) a diblock copolymer as defined hereinbefore, and (2) a block copolymer as defined hereinbefore, wherein the melt index of the block copolymer composition is greater than 15 g/10 min as determined by ASTM D 1238, condition G (200° C., 5 kg) and wherein the ratio of diblock to other block copolymer is greater than about 1:1. In one alternative of this embodiment, the block copolymer composition comprises a diblock of the formula A-B wherein A is styrene and B is butadiene and a linear triblock copolymer of the formula A-B-A wherein A is styrene and B is butadiene. In this embodiment, the peak molecular weight of the diblock copolymer is from about 48,000 to about 78,000, and the peak molecular weight of the linear triblock copolymer is from 1.8 to 2.5 times the peak molecular weight of the diblock copolymer. In this particular embodiment, both the diblock copolymer and the linear triblock copolymer have a vinyl content from about 50 to about 65 mol percent based on the number of repeat monomer units in the conjugated diene block of the specific copolymer, and a polystyrene content from about 0 to about 35%. The ratio of diblock copolymer to linear triblock copolymer is preferably equal to or greater than about 3:2, preferably from about 3:2 to about 10:1, more preferably from about 4:1 to about 7:3. The melt index will preferably range from greater than 15 g/10 minutes to 50 g/10 minutes, more preferably from about 16 g/10 minutes to about 35 g/10 minutes.

In a still further embodiment, the block copolymer composition comprises a diblock of the formula A-B wherein A is styrene and B is butadiene and a multiarm coupled block copolymer of the formula (A-B)$_n$X wherein A is styrene, B is butadiene, n is an integer from 2 to 4, preferably 2, and X is a coupling agent residue. In this embodiment, the peak molecular weight of the diblock copolymer will range from about 48,000 to about 78,000 and the peak molecular weight of the multiarm coupled block copolymer is from about 1.8 to about 5.0 times the peak molecular weight of the diblock copolymer. In this particular embodiment, both the diblock copolymer and the multiarm coupled block copolymer have a vinyl content from about 50 to about 65 mol percent based on the number of repeat monomer units in the conjugated diene block of the specific copolymer, and a polystyrene content from about 20 to about 35%. The ratio of diblock copolymer to multiarm coupled block copolymer is preferably equal to or greater than about 3:2, more preferably from about 3:2 to about 10:1, and even more preferably from about 4:1 to about 7:3. The melt index will preferably range from greater than 15 g/10 minutes to 50 g/10 minutes, more preferably from about 16 g/10 minutes to about 35 g/10 minutes.

As used throughout the present specification, the term "diblock copolymer", references that proportion of free diblock which is finally present in the applied block copolymer composition. It will be appreciated that when the block copolymer composition is prepared via a full sequential polymerization, no material detectable amounts of free diblock copolymers will occur. In this situation, the finally desired amount of diblock can be adjusted to achieve the amount of diblock necessary for the present invention. Accordingly, in the process of the present invention, when the block copolymer composition comprises a diblock copolymer in combination with a linear triblock copolymer made by full sequential polymerization, the amount of monovinyl aromatic hydrocarbon added in the final step of preparing the block copolymer can be adjusted to limit the total amount of triblock copolymer or in the alternative, a sufficient amount of the diblock copolymer can be added to the fully polymerized linear triblock copolymer to achieve the necessary ratio.

When the block copolymers are prepared via initial preparation of intermediate living diblock copolymers, which are subsequently coupled by means of a multivalent coupling agent, the initial diblock content will be determined by the coupling efficiency. Normally in the preparation of most block copolymers, a coupling efficiency in the range of from 80% to 97% is desirable. However, in the present process, while it is possible to utilize polymers having a coupling efficiency of up to 50%. Preferably, there is an even lower degree of coupling (equal to or less than 40% coupling efficiency). For purposes of the present invention, the phrase "coupling efficiency" refers to the number of molecules of coupled polymer divided by the number of molecules of coupled polymer plus the number of molecules of uncoupled polymer. For example, if a coupling efficiency is 80 percent, then the polymer will contain 20 percent diblock. This is well known to those of ordinary skill in the art.

The block copolymer compositions utilized in the process of the present invention may be prepared by any method known in the art including the well known full sequential polymerization method, optionally in combination with reinitiation, and the coupling method, as illustrated in e.g. U.S. Pat. No. 3,231,635; U.S. Pat. No. 3,251,905; U.S. Pat. No. 3,390,207; U.S. Pat. No. 3,598,887, U.S. Pat. No. 4,219,627, EP 0413294 A2, EP 0387671 B1, EP 0636654 A1 and WO 94/22931, each incorporated herein by reference in their entirety.

The block copolymers may therefore, for example, be prepared by coupling at least two diblock copolymer molecules together. The coupling agent may be any di- or polyfunctional coupling agent known in the art, for example, dibromoethane, diethyl adipate, divinylbenzene, dimethyldichlorosilane, methyl dichlorosilane, silicon tetrachloride and alkoxy silanes (U.S. Pat. No. 3,244,664, U.S. Pat. No. 3,692,874, U.S. Pat. No. 4,076,915, U.S. Pat. No. 5,075,377, U.S. Pat. No. 5,272,214 and U.S. Pat. No. 5,681,895), polyepoxides, polyisocyanates, polyimines, polyaldehydes, polyketones, polyanhydrides, polyesters, polyhalides (U.S. Pat. No. 3,281, 383); diesters (U.S. Pat. No. 3,594,452); methoxy silanes (U.S. Pat. No. 3,880,954); divinyl benzene (U.S. Pat. No. 3,985,830); 1,3,5-benzenetricarboxylic acid trichloride (U.S. Pat. No. 4,104,332); glycidoxytrimethoxy silanes (U.S. Pat. No. 4,185,042); and oxydipropylbis(trimethoxy silane) (U.S. Pat. No. 4,379,891).

In general, the polymers useful in the process of the present invention may be prepared by contacting the monomer or monomers with an organoalkali metal compound in a suitable solvent at a temperature within from about −150° C. to about 300° C., preferably at a temperature within the range of from about 0° C. to about 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which see butyl is preferred. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Accordingly, suitable solvents include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

In addition to the above noted bitumen component and block copolymer composition, other optional ingredients may be added during the process of the present invention, including, but not limited to, resins, oils, stabilizers, antistatics, fillers (such as talc, calcium carbonate and carbon black), polyphosphoric acid, ground tire rubber or flame retardants. The amount of such optional ingredients added can range from 0 to about 20% by weight, based on the total weight of the bituminous binder composition. Particularly preferred additional ingredients are antioxidants which may be added during or after the mixing process to affect the rate of reaction. When antioxidants are added, they are present in an amount from about 0.1% by weight to about 5% by weight, based on the total weight of the bituminous binder composition. In addition, other block copolymers may also be included in the final bituminous binder composition of the present invention. Preferably such block copolymers will be block copolymers of the general formulas C-D-C or (C-D)nX wherein C is a monovinyl aromatic hydrocarbon block and D is a conjugated diene block, n is an integer from 2 to 6 and X is the residue of a coupling agent, said block copolymer having a peak molecular weight from about 30,000 to about 400,000 and a vinyl content from about 8 mol percent to about 25 mol percent based on the number of repeat monomer units in the conjugated diene block of the block copolymer. Examples of such block copolymers include, but are not limited to, Kraton D 1101 polymer and Kraton D 1184 polymer, each commercially available from Kraton Polymers LLC. When such additional block copolymers are present, they will preferably be present in an amount up to about 30% by weight, based on the total weight of block copolymer added. When these additional components are added to the process, they are typically added at the same time as the block copolymer composition. Alternatively, these additional components may be added just before the addition of the block copolymer composition or just after the addition of the block copolymer composition.

The present invention further relates to a specific polymer modified bituminous binder composition that is substantially free of any cross-linking agents, said bituminous binder composition comprising:

a. about 64 to about 98% by weight of a bitumen component as defined hereinbefore; and b. about 2 to about 36% by weight of a block copolymer composition comprising:

(i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and (ii) one or more block copolymers comprising at least two blocks of monovinylaromatic hydrocarbon and at least one block of conjugated diene, the block copolymer selected from linear triblock copolymers, multiarm coupled block copolymers, and mixtures thereof, the linear triblock copolymers having a peak molecular weight that is 1.5 to 3.0 times the peak molecular weight of the diblock copolymer and multiarm coupled block copolymers having a peak molecular weight that is 1.5 to 9.0 times the peak molecular weight of the diblock copolymer, and each having a vinyl content from about 35 to about 80 mol percent based on the number of repeat monomer units in the conjugated diene block, wherein the melt index of the block copolymer composition is greater than 15 g/10 min as determined by ASTM D 1238, condition G (200° C., 5 kg) and wherein the ratio of (i) to (ii) is greater than about 1:1, preferably equal to or greater than about 3:2.

In one preferred embodiment, the block copolymer composition comprises a diblock of the formula A-B wherein A is styrene and B is butadiene and a linear triblock copolymer of the formula A-B-A wherein A is styrene and B is butadiene. In this embodiment, the peak molecular weight of the diblock copolymer is from about 48,000 to about 78,000, and the peak molecular weight of the linear triblock copolymer is from about 1.8 to about 2.5 times the peak molecular weight of the diblock copolymer. In this particular embodiment, both the diblock copolymer and the linear triblock copolymer have a vinyl content from about 50 to about 65 mol percent based on the number of repeat monomer units in the conjugated diene block of the specific copolymer, and a polystyrene content from about 20 to about 35%. The ratio of diblock copolymer to linear triblock copolymer is preferably from about 3:2 to about 10:1, more preferably from about 4:1 to about 7:3. The melt index will preferably range from greater than 15 g/10 minutes to 50 g/10 minutes, more preferably from about 16 g/10 minutes to about 35 g/10 minutes.

In a still further preferred embodiment, the block copolymer composition comprises a diblock of the formula A-B wherein A is styrene and B is butadiene and a multiarm coupled block copolymer of the formula $(A-B)_n X$ wherein A is styrene, B is butadiene, n is an integer from 2 to 4, preferably 2, and X is a coupling agent residue. In this embodiment, the peak molecular weight of the diblock copolymer will range from about 48,000 to about 78,000 and the peak molecular weight of the multiarm coupled block copolymer is from about 1.8 to about 5.0 times the peak molecular weight of the diblock copolymer. In this particular embodiment, both the diblock copolymer and the multiarm coupled block copolymer have a vinyl content from about 50 to about 65 mol percent based on the number of repeat monomer units in the conjugated diene block of the specific copolymer, and a polystyrene content from about 20 to about 35%. The ratio of diblock copolymer to multiarm coupled block copolymer is preferably from about 3:2 to about 10:1, more preferably from about 4:1 to about 7:3. The melt index will preferably range from greater than 15 g/10 minutes to 50 g/10 minutes, more preferably from about 16 g/10 minutes to about 35 g/10 minutes.

The present invention still further relates to a specific bituminous binder concentrate that is substantially free of any cross-linking agents, said bituminous binder concentrate comprising:

a. about 64 to about 93% by weight of a bitumen component as defined hereinbefore; and b. about 7 to about 36% by weight of a block copolymer composition comprising:

(i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and (ii) one or more block copolymers comprising at least two blocks of monovinylaromatic hydrocarbon and at least one block of conjugated diene, the block copolymer selected from linear triblock copolymers, multiarm coupled block copolymers, and mixtures thereof, the linear triblock copolymers having a peak molecular weight that is 1.5 to 3.0 times the peak molecular weight of the diblock copolymer and multiarm coupled block copolymers having a peak molecular weight that is 1.5 to 9.0 times the peak molecular weight of the diblock copolymer, and each having a vinyl content from about 35 to about 80 mol percent based on the number of repeat monomer units in the conjugated diene block, wherein the melt index of the block copolymer composition is greater than 15 g/10 min as determined by ASTM D 1238, condition G (200° C., 5 kg) and wherein the ratio of (i) to (ii) is greater than about 1:1, preferably greater than or equal to about 3:2.

While the present invention is particularly suited for hot mix bitumen concrete, the products of the present invention will also be useful in other typical SBS polymer modified bitumen paving applications such as hot chip seals, cut backs and emulsions. It is also envisioned that the present invention is suitable for non-paving applications such as modified bitumen roll roofing, self-adhesion waterproofing membranes, sound deadening and vibration damping compounds. The present invention is also useful for recycled asphalt pavement.

As noted the present bituminous binder composition can be taken up in an emulsion. This emulsion can then be sprayed onto a surface to be coated and thereafter, the emulsion is broken and a coating remains.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustrative purposes only and are not to be construed as limiting the invention.

Examples

Bitumens 1 to 4

The following four bitumens were used in the examples below. Those skilled in the art are aware that many bitumens can be modified to varying degrees with conventional SBS polymers while others are moderately to extremely difficult to modify. A variety of bitumens which are generally considered to be "difficult" bitumens have been utilized to demonstrate the present invention. More specifically, the Canadian bitumen utilized can typically be modified with SBS polymers but requires sulfur or other crosslinking technology for suitable compatability. The Far East bitumen asphalt utilized is incompatible to the degree that it typically cannot be modified with SBS polymers at all. The European asphalt utilized is difficult to modify for different reasons—its poor aging characteristics leads to premature cracking in pavements and gelation when modified.

TABLE 1

| Bitumen | | 25° C. pen, units | Softening Point, ° C. | PG High Temperature Limit, ° C. | PG Low Temperature Limit, ° C. | PG Temperature Range, ° C. |
| --- | --- | --- | --- | --- | --- | --- |
| 1 | moderately incompatible Canadian bitumen | 173 | 42 | 51.5 | −33.3 | 84.8 |
| 2 | waxy paraffinic Far East bitumen | 141 | 49 | 65.3 | −31.6 | 95.9 |
| 3 | European vacuum flashed cracked residue with poor aging characteristics | 65 | 51 | 64.6 | −13.5 | 78.1 |

TABLE 1-continued

| Bitumen | | 25° C. pen, units | Softening Point, ° C. | PG High Temperature Limit, ° C. | PG Low Temperature Limit, ° C. | PG Temperature Range, ° C. |
|---|---|---|---|---|---|---|
| 4 | Compatible PX grade European bitumen | 200 | — | — | — | — |

PG = Performance Grade as defined hereinbelow.

Comparative Polymers C1 to C3

The following three commercial polymers were used in the formulations for comparative purposes.

TABLE 2

| | Commercial Comparative Examples | | |
|---|---|---|---|
| | Comparative Polymer C1 | Comparative Polymer C2 | Comparative Polymer C3 |
| Commercial Name | Kraton D1118 polymer[1] | Kraton KX222 polymer[2] | Kraton D1101 polymer[3] |
| Styrene block molecular weight* | 16,000 | 15,000 | 16,000 |
| Diblock molecular weight* | 54,000 | 49,000 | 56,000 |
| Triblock/ radial molecular weight* | 108,000 | 167,000 | 112,000 |
| Styrene content | 33% | 18% | 31% |
| Coupling efficiency | 22% | 90% | 85% |
| Vinyl content | 8% | 57% | 8% |

*The molecular weights referenced are peak molecular weights.
[1]Kraton D1118 polymer is a low vinyl, low coupled (high styrene-butadiene diblock content) block copolymer in porous pellet form, commercially available from Kraton Polymers LLC.
[2]Kraton DKX222 polymer is a high vinyl, high coupled styrene-butadiene-styrene block copolymer in porous pellet form, commercially available from Kraton Polymers LLC.
[3]Kraton D1101 polymer is a low vinyl, high coupled styrene-butadiene-styrene block copolymer in porous pellet form, commercially available from Kraton Polymers LLC.

Inventive Polymers 1 to 3

Inventive polymers 1, 2, 2a and 3 of the present invention were prepared by conventional polymerization methods based on the general procedures noted below:

Inventive Polymer 1

305 g styrene was added to 6 liters of cyclohexane at 50° C., after which 18.8 mmol of sec-butyl lithium was added. The reaction was completed after 40 minutes. Thereafter, 1.34 mL 1,2-diethoxypropane was added, followed by the addition of 651 g of butadiene over a period of 10 minutes. The temperature of the reaction mixture rose to 60° C. The polymerization was allowed to proceed at this temperature for 85 minutes. At this point in the polymerization a sample was taken from the reaction and analyzed by GPC test method ASTM D3536. 0.19 mL of the coupling agent 1,2-dibromoethane was then added to the reaction mixture. The reaction mixture was allowed to stand for 15 minutes at 60° C. then terminated with 0.6 mL of methanol. After cooling down the reaction mixture, 1.43 g of Ionol was added for stabilization. The product was isolated by steam stripping to give white crumbs.

Inventive Polymer 2

The same procedure noted above for Inventive Polymer 1 was utilized in the preparation of Inventive Polymer 2 with the following exceptions in material amounts: 339 g styrene, 20.9 mmol of sec-butyl lithium, 4.0 mL 1,2-diethoxypropane, 725 g butadiene, 0.21 mL 1,2-dibromoethane, 0.6 mL methanol, 1.60 g Ionol.

Inventive Polymer 2a

The same procedure noted above for Inventive Polymer 2 was used in the preparation of Inventive Polymer 2a with the only exception being that this polymer was finished in the form of porous pellets.

Inventive Polymer 3

The same procedure noted above for Inventive Polymer 1 was utilized in the preparation of Inventive Polymer 3 with the following exceptions in material amounts: 274 g styrene, 16.9 mmol of sec-butyl lithium, 5.1 mL 1,2-diethoxypropane, 610 g butadiene, 0.22 mL 1,2-dibromoethane, 0.4 mL methanol, 1.33 g Ionol.

Table 3 lists the molecular parameters obtained for Inventive Polymers 1, 2, 2a and 3.

TABLE 3

| | Block Copolymers of the Present Invention | | | |
|---|---|---|---|---|
| Property | Inventive Polymer 1 | Inventive Polymer 2 | Inventive Polymer 2a | Inventive Polymer 3 |
| Styrene block molecular weight* | 16,000 | 16,000 | 16,000 | 16,000 |
| Diblock molecular weight* | 56,000 | 55,000 | 60,000 | 58,000 |
| Triblock/ radial molecular weight* | 112,000 | 110,000 | 120,000 | 116,000 |
| Styrene content | 31% | 31% | 32% | 31% |
| Coupling efficiency | 19.6% | 20.9% | 24.4% | 29% |
| Vinyl content | 38.9% | 58.7% | 58% | 63.7% |
| Melt Index** | 23.5 | 20.5 | 20.6 | — |

*The molecular weight references are peak molecular weights.
**The melt index was determined using ASTM D 1238, condition G (200° C., 5 kg load).

Examples 1 to 15 of the Present Invention

For Examples 1 to 15 the following blend procedure was used:

The bitumen utilized was heated to 190° C. and subsequently 12% by weight of the noted polymer was added. Blends utilizing Inventive Polymers 1 to 3 of the present invention, as well as Comparative Polymers C1 to C3, were made by producing a concentrate comprising bitumen and each of the block copolymers wherein the final concentration of block copolymer was 12%. Concentrate blends were made by mixing the bitumen component and block copolymer composition with a Silverson L4R high shear mixer for 1.5 hours while maintaining the temperature. This concentrate was then diluted to the final concentration indicated in Table 4. Let down blends were generally mixed using a on low shear paddle mixer for 23 hours. See Example 4 for the exception.

The mixtures were tested for classical properties, penetration according to ASTM D 5, softening point according to ASTM D 36, rotational viscosity according to ASTM D 4402 and separation for storage stability according to ASTM D 5892. These tests are commonly used to evaluate Polymer Modified Bitumens and are well known to those skilled in the art. The mixtures were also graded according to the Performance Grade (PG) protocol as set forth in ASTM D6373 and AASHTO M320. While this protocol is somewhat complex, it is commonly practiced in the United States and elsewhere in the world and is well known to those skilled in the art. The PG protocol grades bituminous binders into classes of high and low temperature with the classes being six degrees Celsius apart. Thus, a binder may grade as PG 64-28 or PG 70-22 so that the binder will be expected to perform within a pavement temperature range of −28° C. to +64° C. or −22° C. to +70° C. respectively. Note that both of these grades cover a temperature range of 92° C. For comparative purposes it is common practice for researchers to interpolate the numerous parameters in the protocol to determine "exact" PG grades. Thus two binders, A and B, may both grade as PG 64-28. However, if binder A has an exact grade of 68.3-31.1 and binder B has an exact grade of 65.1-29.1, binder A would be deemed a superior material as it covers a broader temperature range than binder B, 99.4° C. versus 94.1° C. For the purposes of this invention, the PG exact grade of the bituminous binder compositions will be reported, as well as the temperature range. Classical properties are shown in Table 5. PG exact grades and temperature ranges are shown in Table 6.

TABLE 4

Summary Table of Blends

| Example | Bitumen | Polymer | Concentration | | Mixing Shear | Temp., ° C. |
|---|---|---|---|---|---|---|
| 1 | 1 | C3 | | 4% | High | 200 |
| 2 | 1 | 2 | Concentrate | 12% | High | 220 |
|   |   |   | Diluted to | 4% | Low | 220 |
| 3 | 1 | C1 | | 4% | High* | 180* |
| 4 | 1 | C1 | Concentrate | 12% | High | 195 |
|   |   |   | Diluted to | 4% | Low** | 195** |
| 5 | 1 | C1 | Concentrate | 12% | High | 195 |
|   |   |   | Diluted to | 4% | Low | 195 |
| 6 | 1 | 3 | Concentrate | 12% | High | 195 |
|   |   |   | Diluted to | 4% | Low | 195 |
| 7 | 1 | C2 | Concentrate | 12% | High | 195 |
|   |   |   | Diluted to | 4% | Low | 195 |
| 8 | 2 | 1 | Concentrate | 12% | High | 195 |
|   |   |   | Diluted to | 4% | Low | 195 |
| 9 | 2 | 2 | Concentrate | 12% | High | 195 |
|   |   |   | Diluted to | 4% | Low | 195 |
| 10 | 2 | 3 | Concentrate | 12% | High | 195 |
|   |   |   | Diluted to | 4% | Low | 195 |
| 11 | 2 | C2 | Concentrate | 12% | High | 195 |
|   |   |   | Diluted to | 4% | Low | 195 |
| 12 | 3 | 2 | Concentrate | 12% | High | 195 |
|   |   |   | Diluted to | 4% | Low | 195 |
| 13 | 3 | 1 | Concentrate | 12% | High | 195 |
|   |   |   | Diluted to | 4% | Low | 195 |
| 14 | 3 | 3 | Concentrate | 12% | High | 195 |
|   |   |   | Diluted to | 4% | Low | 195 |
| 15 | 3 | C2 | Concentrate | 12% | High | 195 |
|   |   |   | Diluted to | 4% | Low | 195 |

*Crosslinked with 0.05% w of a mixture of sulfur, zinc oxide, calcium stearate and methyl zimate.
**Low shear stirred only 1 hour to thoroughly blend.

TABLE 5

Summary Table of Classical Properties for Blends

| Example | Penetration at 25° C., units | Softening point, ° C. | Storage stability, softening point difference, ° C. | Rotational viscosity @135° C., cps |
|---|---|---|---|---|
| 1 | 89 | 66 | 32 | 775 |
| 2 | 82 | 58 | −1 | 710 |
| 3 | Good | 57 | 2 | Good |
| 4 | 139 | 51 | −2 | 535 |
| 5 | 105 | 56 | 3 | 750 |
| 6 | 75 | 58 | 0 | 640 |
| 7 | 71 | 66 | −1 | 1,620 |
| 8 | 54 | 58 | 22 | 1,620 |
| 9 | 49 | 64 | 2 | — |
| 10 | 40 | — | — | 2,360 |
| 11 | — | — | — | — |
| 12 | 25 | — | 1 | — |
| 13 | 26 | — | −1 | — |
| 14 | — | — | — | — |
| 15 | — | — | — | — |

TABLE 6

Summary PG Grading Data on Blends

| Example | PG High Temperature Limit, ° C. | PG Low Temperature Limit, ° C. | PG Temperature Range, ° C. |
|---|---|---|---|
| 1 | 65.9 | −27.9 | 93.8 |
| 2 | 68.5 | −29.5 | 98.0 |
| 3 | 65.0 | −23.9 | 88.9 |
| 4 | 62.0 | −32.1 | 94.1 |
| 5 | 66.3 | −34.0 | 100.3 |
| 6 | 69.4 | −31.8 | 101.2 |
| 7 | 76.2 | −31.4 | 107.6 |
| 8 | 75.4 | −34.1 | 109.5 |
| 9 | 77.6 | −32.9 | 110.5 |
| 10 | 84.3 | Phase sep | — |
| 11 | Phase sep | — | — |
| 12 | 86.7 | Phase sep | — |
| 13 | 87.6 | Phase sep | — |
| 14 | Phase sep | — | — |
| 15 | Phase sep | — | — |

With regard to the above examples, Bitumen 1 is a Canadian bitumen that is considered challenging to modify with SBS polymers. Example 1 is comparative example that is a typical conventional blend of a commercial linear SBS polymer (Comparative Polymer C3) at 4% concentration in Bitumen 1. The properties of the blend are good but the separation potential is high with a softening point difference of 32° C. This is considered unacceptable by many specifying agencies.

Example 2 is exemplary of the present invention (using Inventive Polymer 2). The process and polymer of the invention gave comparable classical properties, improved PG properties and a separation softening point difference of only 1° C.

Examples 3 to 5 are comparative examples and are to demonstrate the effects of high diblock without the benefit of high vinyl content. In Example 3, a commercial high diblock SBS polymer (Comparative Polymer C1) was blended in a conventional process, then crosslinked with a sulfur containing agent. The properties and separation were good, but sulfur based crosslinking was required. In Examples 4 and 5 (comparative examples made using Comparative Polymer C1) no sulfur crosslinking was used. With or without curing there was adequate low separation but less than superior performance properties were found. Note that Examples 4 and 5 were run at a different time with comparable Canadian bitumen (a different batch)).

Example 6 demonstrated that a second polymer of the invention (inventive Polymer 3) with higher coupling still gives good properties and adequately low separation in the Canadian bitumen.

Example 7 is a comparative example that demonstrated that a comparative polymer with a very high coupling efficiency (90%) and a high vinyl content (Comparative Polymer C2) works in this bitumen though the viscosity is higher thereby limiting the concentration range for this comparative polymer.

Examples 8 through 10 (examples of the present invention utilizing Inventive Polymers 1, 2 and 3, respectively) and Example 11 (a comparative example utilizing Comparative Polymer C2) examined polymers of the present invention and the prior art in the process of the present invention using a Far East waxy paraffinic bitumen (Bitumen 2) that is considered the most challenging bitumen to modify with SBS polymers. Inventive Polymer 2 with high vinyl content (58.5 mol %) and low coupling (20.9%), example 9, was the only polymer that gave satisfactory results. Inventive Polymer 1 with a lower vinyl content (38.9 mol %) and low coupling (19.6%), example 8, could be processed but still gave a large degree of separation, 22° C. Inventive Polymer 3 with high vinyl content (63.7 mol %) and a higher coupling (29%), example 10, and Comparative Polymer C2, a high vinyl radial polymer (57 mol %) with high coupling (90%), example 11, gelled during the PG aging protocol so that testing could not be completed. These results demonstrated that sufficiently high vinyl content and sufficiently low coupling are both required for optimum results in difficult bitumens.

Examples 12 through 15 demonstrated that the present invention, as well as the prior art, cannot address all bitumens that are difficult to modify. Although Inventive Polymers 1 and 2 were better than Inventive Polymer 3 and Comparative Polymer C2, all four gelled during the PG aging protocol so testing could not be completed. This was thought to be due to the poor aging characteristics of European bitumen.

Mixing Dissolution Rate/Concentration Effects

To demonstrate ease of mixing, mixing time studies were performed on Comparative Polymers C1, C2 and C3, and Inventive Polymer 2a of the present invention. Note that Inventive Polymer 2a is similar to Inventive Polymer 2 used in Examples 2, 3, 9 and 12. However, Inventive Polymer 2a was produced as a porous pellet with similar morphology and density to the Comparative Polymers. Density and morphology affect mixing time so this distinction is important. In the mixing time studies, the polymer pellets of the Comparative Polymers C1, C2 and C3 were blended into bitumen and the rotational viscosity was constantly measured. After the viscosity plateaus the points at which the viscosity reached 90%, 95% and 99% of the final value were noted. These times are reported in Table 7 below. Because if its high vinyl content polymer Comparative Polymer C2 dissolved faster than polymer Comparative Polymer C3 despite its higher molecular weight. Comparative Polymer C1 dissolved faster than either Comparative Polymer C2 or Comparative Polymer C3 because of its low coupling efficiency (high diblock content). Inventive Polymer 2a combines high vinyl content and low coupling efficiency and gives comparable mixing times to the previous best. When mixed at 180° C., Inventive Polymer 2a dissolved completely in less than one hour.

TABLE 7

Mixing times in hours for 12% Polymer in Bitumen 4 at 150° C.

| Polymer | M90% | M95% | M99% |
| --- | --- | --- | --- |
| C3 | 3.47 | 4.14 | 5.51 |
| C1 | 1.01 | 1.80 | 3.85 |
| C2 | 2.61 | 3.35 | 4.80 |
| 2a | 1.04 | 2.08 | 4.76 |

Polymer Concentration in Bitumen

A key benefit of the invention is that high polymer concentrations may be used in the process of producing a concentrate. The limiting factor in concentration is typically viscosity. At PMB processing facilities the maximum desirable viscosity is generally 3000 to 4000 cps. As shown in Table 8 moderately high concentrations of 12-18% are readily processable at temperatures as low as 135° C. while very high concentrations of 24-30% are still processable at 195° C. to 210° C., the processing and curing temperatures of the present invention.

TABLE 8

Viscosity versus Concentration for Inventive Polymer 2 in Bitumen 1.

| Polymer concentration | Temperature, ° C. | | | | | |
| --- | --- | --- | --- | --- | --- | --- |
| | 135 | 150 | 165 | 180 | 195 | 210 |
| | Viscosity, cps | | | | | |
| 30% | | | | 7,190 | 4,060 | 2,580 |
| 24% | | | 6,960 | 3,610 | 2,220 | 1,530 |
| 18% | | 5950 | 2,740 | 1,500 | 1,010 | 710 |
| 12% | 3,460 | 1480 | 847 | 528 | 343 | 242 |

The invention claimed is:

1. A block copolymer composition comprising
(i) a diblock copolymer comprising one block of a monovinylaromatic hydrocarbon and one block of a conjugated diene having a peak molecular weight from 30,000 to 78,000 and a vinyl content from 35 to 80 mol percent based on the number of repeat monomer units in the conjugated diene block, and
(ii) a block copolymer comprising at least two blocks of monovinylaromatic hydrocarbon and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the block copolymer composition is from about 20 g/10 min to about 35 g/10 min as determined by ASTM D-1238, condition G (200° C., 5 kg) and wherein the ratio of (i) to (ii) in the block copolymer composition is greater than 1:1.

2. The block copolymer composition of claim 1 wherein the ratio of (i) to (ii) is greater than or equal to 3:2, the diblock copolymer (i) is of the formula A-B and the optional block copolymer (ii) is selected from the group consisting of block copolymers of the formula A-B-A and (A-B)nX wherein with regard to the formulas A is a block of monovinyl aromatic hydrocarbon, B is a block of conjugated diene, n is an integer from 2 to 6 and X is a coupling agent residue.

3. The block copolymer composition of claim 2 wherein the block copolymer composition comprises A-B and A-B-A wherein each A is styrene and each B is butadiene, the peak molecular weight of A-B is from 48,000 to 78,000 and the vinyl content is from 46 to 70 mol percent based on the number of repeat monomer units in the conjugated diene block of A-B, and the peak molecular weight of A-B-A is 1.8 to 2.5 times the peak molecular weight of A-B and the vinyl content is from 46 to 70 mol percent based on the number of repeat monomer units in the conjugated diene block of A-B-A, and the polystyrene content of A-B is from 25 to 35% and the polystyrene content of A-B-A is from 25 to 35%.

* * * * *